United States Patent [19]

Kurandt

[11] 4,399,110

[45] Aug. 16, 1983

[54] PROCESS FOR REDUCING THE RADIOACTIVITY OF CALCIUM SULFATE PREPARED FROM PHOSPHATE ROCK

[75] Inventor: Hans-Friedrich Kurandt, Lüneburg, Fed. Rep. of Germany

[73] Assignee: Chemische Werke Huls Aktiengesellschaft, Marl, Fed. Rep. of Germany

[21] Appl. No.: 272,681

[22] Filed: Jun. 11, 1981

[30] Foreign Application Priority Data

Jun. 11, 1980 [DE] Fed. Rep. of Germany ....... 3021839

[51] Int. Cl.³ .......................... C01F 11/46; C01F 5/12; C01B 25/16; C01G 43/00
[52] U.S. Cl. .................................... 423/167; 423/170; 423/15; 423/18; 423/20; 423/319; 423/321 R; 423/555; 106/109
[58] Field of Search .................... 423/555, 319, 321 R, 423/170, 18, 20, 15, 167; 106/109, 110

[56] References Cited

U.S. PATENT DOCUMENTS

| T970,007 | 5/1978 | McCullough et al. | 423/18 |
|---|---|---|---|
| 1,856,187 | 5/1932 | Johnson | 423/319 |
| 1,936,316 | 11/1933 | Wadsted | 423/319 |
| 3,382,035 | 5/1968 | Slater | 423/319 |
| 3,880,980 | 4/1975 | Wamser | 423/15 |
| 3,919,395 | 11/1975 | Hauge | 423/319 |
| 4,012,491 | 3/1977 | Hauge | 423/319 |
| 4,073,635 | 2/1978 | Suppanen | 423/321 R |
| 4,180,545 | 12/1979 | McCullough et al. | 423/15 |
| 4,301,122 | 11/1981 | Johnson | 423/15 |
| 4,311,677 | 1/1982 | Geruwda et al. | 423/321 R |
| 4,328,193 | 5/1982 | Larson | 423/555 |
| 4,353,877 | 10/1982 | Rendall | 423/321 R |

FOREIGN PATENT DOCUMENTS

| 2402758 | 7/1974 | Fed. Rep. of Germany | 423/321 |
|---|---|---|---|
| 49-28353 | 7/1974 | Japan | 423/555 |
| 51-75697 | 6/1976 | Japan | 423/319 |
| 768946 | 2/1957 | United Kingdom | 423/18 |

Primary Examiner—Gary P. Straub
Attorney, Agent, or Firm—Oblon, Fisher, Spivak, McClelland & Maier

[57] ABSTRACT

The level of radioactivity in gypsum produced from phosphate rock can be reduced by adding to the slurry of acid and phosphate rock in the conventional process for producing phosphoric acid a combination of concentrated nitric acid or hydrochloric acid and an ammonium salt, especially ammonium nitrate or ammonium phosphate, before the precipitation of the calcium sulfate.

4 Claims, No Drawings

PROCESS FOR REDUCING THE RADIOACTIVITY OF CALCIUM SULFATE PREPARED FROM PHOSPHATE ROCK

BACKGROUND OF THE INVENTION

Description of the Prior art

Fertilizers and phosphoric acid are prepared from phosphate rock. Although a minor fraction of the phosphates is of magmatic origin (apatite), the major portion of the phosphate deposits on the earth are found as sedimentary phosphates (phosphate rock).

Apatites are almost devoid of radioactivity, while phosphate rock possesses some, albeit weak, radioactivity, which varies with the type of phosphate rock. This radioactivity is attributable to the uranium content of the phosphate rock and to the radium which is present due to the decay of the uranium. In the conventional method of preparing phosphoric acid by the decomposition of phosphate rock with sulfuric acid, the radium present in the phosphate is almost completely removed in the process together with the calcium sulfate as the very slightly soluble radium sulfate $RaSO_4$, and remains in the sulfate precipitate, while the uranium remains dissolved in the phosphoric acid which is principally used for fertilizer.

A small amount of radioactivity in a fertilizer can cause practically no radiation injury since it is widely distributed when the fertilizer is spread on the land. Furthermore, the radium remains fixed in the soil as a consequence of the extraordinarily low solubility of $RaSO_4$, and thus is not taken up by the plants. Accordingly, health problems never arise from fertilizers and their use.

In the production of gypsum, the radioactivity caused by the presence of $RaSO_4$ causes no trouble provided that the gypsum is disposed of in the ocean or in a dump, as is generally the case. Furthermore, the radioactivity causes no trouble when the gypsum from phosphoric acid production is used as a retardant in cement, since generally only 3–5% $CaSO_4$ is added to the cement. As a consequence of this dilution, the radioactivity of the cement can in general be neglected. However, the radioactivity of the gypsum from phosphoric acid production can be a problem whenever the gypsum is used directly for building purposes, e.g. for production of gypsum plasterboard, gypsum wallboard, or gypsum stone. In gypsum plaster, the radioactivity is not so important as in the above-mentioned building elements, because the quantity of gypsum added is smaller.

In order to ensure a multi-faceted application of the gypsum from phosphoric acid production, it is desirable to reduce the radioactivity. In the report commissioned by the German Federal Department of the Interior, "Exposure to external radiation in the German Federal republic by naturally radioactive materials in the open and in dwellings, taking into account the effect of building materials", the radioactivity of building materials, among others, is given.

According to this source, most of the synthetic gypsum derived from phosphate rock has a radioactivity between 10 and 25 nCi/kg, while some is over 25 nCi/kg. On page 28 of the report, the following limits for building materials are given:
radium and thorium content;
<10 nCi/kg—unlimited application
10–25 nCi/kg—must be disclosed
>25 nCi/kg—cannot be used.

This report also establishes as a goal the development of a process for preparing building gypsum whereby a gypsum from production of phosphoric acid having a radioactivity of less than 10 nCi/kg can be prepared even from phosphate rock containing relatively large amounts of uranium.

SUMMARY OF THE INVENTION

Surprisingly this problem could be solved by adding to the slurry used in the preparation of phosphoric acid before the precipitation of the calcium sulfate, a combination of concentrated nitric acid or hydrochloric acid and ammonium salts, in particular ammonium nitrate or ammonium phosphate.

DETAILED DESCRIPTION OF THE INVENTION AND PREFERRED EMBODIMENTS

In general the process is operated so that the additives of this invention are added to the slurry before the precipitation of the calcium sulfate, the gypsum is precipitated by addition of sulfuric acid or sulfates, the precipitate is digested at a temperature of 60°–110° C. for a period of 1–10 hrs, and then the phosphoric acid is separated by filtration.

When sulfuric acid is used for the decomposition, the calcium present in the phosphate rock is immediately converted into calcium sulfate. In this case the digestion should preferably be carried out for a period of 5–10 hrs. However, it is possible to add the strong mineral acids and the ammonium salts already at the beginning of the decomposition. The acids should be added in concentrated form; thus hydrochloric acid should be used in concentrations of more than 32% and nitric acid at least 40%, preferably 65% $HNO_3$, or, if desired, even in the form of the so-called Hoko, i.e., more than 99% $HNO_3$.

Since the separated phosphoric acid is, for the most part, used for preparation of fertilizer, it is preferred to use nitric acid and to use ammonium nitrate or ammonium phosphate as the ammonium salts.

The ammonium salts can also be prepared in situ in the slurry by addition of ammonia to the acid mixture.

The calcium sulfate produced can be precipitated and separated as the dihydrate, hemihydrate or as anhydrite, according to the reaction conditions (temperature and concentration of the acid).

The radioactivity of the building gypsum so prepared is less than 10 nCi/kg. The details of the results obtained by the process of this invention are summarized in the following table:

| Phosphate Type | Calcium Sulfate Normal Phosphoric acid Process | Prepared by HNO₃ Without Ammonium Salts Radioacitivity (nCi/kg) | Process of the Invention |
|---|---|---|---|
| Florida phosphate | 20 | 13 | 6 |
| North Carolina phosphate | 21 | — | 7 |
| Marokko phosphate | 31 | 19 | 9 |
| Taiba phosphate | 17 | 12 | 6 |
| Togo phosphate | 20 | 14 | 7 |

| Phosphate Type | Calcium Sulfate Normal Phosphoric acid Process | Prepared by HNO3 Without Ammonium Salts Radio- acitivity (nCi/kg) | Process of the Invention |
|---|---|---|---|
| Kola phosphate (apatite) | 2 | — | 1 |

The water content was about 20% in all products (corresponding to the water content of dry dihydrate).

The process of the invention will be more clearly illustrated by the following examples.

EXAMPLE 1

In the preparation of phosphoric acid three tons of Togo phosphate were slurried in the conventional manner with a mixture of 2,700 kg of sulfuric acid (96%) and about 3,000 l of recirculated acid from the filtration, then 600 kg of $HNO_3$ (40%) were added to the slurry along with 300 kg of monoammonium phosphate. The radioactivity of the filtered and dried gypsum was about 7 nCi/kg of gypsum, while the gypsum prepared by the conventional phosphoric acid process without the additives of this invention had a radioactivity of 20 nCi/kg.

EXAMPLE 2

In the preparation of phosphoric acid three tons of Marokko phosphate were slurried in the conventional manner with a mixture of 3,000 kg of sulfuric acid (96%) and 3,000 l of acid recycled from the filtration. Then 1,000 kg $HNO_3$ (60%) were added, and also, prior to filtration, 120 kg $NH_3$. The calcium sulfate was separated as the hemihydrate. The radioactivity was about 9 nCi/kg, while gypsum prepared by the conventional process for making phosphoric acid without the specified added materials had a radioactivity of 31 nCi/kg.

EXAMPLE 3 (NOT ACCORDING TO THE INVENTION)

Example 2 was repeated, however, *no* $NH_3$ was added. By this process calcium sulfate was obtained having a radioactivity of 19 nCi/kg, that is, about double the radioactivity of the process of the invention in Example 2.

What is claimed as new and sought to be protected by Letters Patent of the United States is:

1. A process for producing calcium sulfate having low levels of radioactivity from phosphate rock comprising:
    (1) reacting said phosphate rock with sulfuric acid, whereby a slurry is produced;
    (2) adding to said slurry a concentrated mineral acid selected from the group consisting of nitric acid and hydrochloric acid, and an ammonium salt selected from the group consisting of ammonium nitrate and ammonium phosphate; and
    (3) separating calcium sulfate from the soluble reaction products and phosphoric acid in said slurry.

2. The process of claim 1, wherein said calcium sulfate is digested after step 2 at a temperature of 60°–110° C. for a period of 5–10 hours before separating from the soluble reaction products in said slurry.

3. A process for producing calcium sulfate having low levels of radioactivity from phosphate rock comprising:
    (1) reacting said phosphate rock with a mineral acid selected from the group consisting of nitric acid and hydrochloric acid, whereby a slurry is produced;
    (2) adding to said slurry an ammonium salt selected from the group consisting of ammonium nitrate and ammonium phosphate;
    (3) precipitating calcium sulfate by the addition of sulfuric acid or an inorganic sulfate to said slurry; and
    (4) separating calcium sulfate from the soluble reaction products and phosphoric acid in said slurry.

4. The process of claim 3, wherein said calcium sulfate is digested at a temperature of 60°–110° C. for a period of 1–10 hours before separating from the soluble reaction products in said slurry.

* * * * *